US009378855B2

(12) United States Patent
Ganesan

(10) Patent No.: US 9,378,855 B2
(45) Date of Patent: *Jun. 28, 2016

(54) FLOATING NUCLEAR POWER REACTOR WITH A SELF-COOLING MULTIPLE COMPONENT CONTAINMENT STRUCTURE AND AN AUTOMATIC RADIATION SCRUBBING CONTAINMENT STRUCTURE

(71) Applicant: Palvannanathan Ganesan, Omaha, NE (US)

(72) Inventor: Palvannanathan Ganesan, Omaha, NE (US)

(*) Notice: Subject to any disclaimer, the term of this patent is extended or adjusted under 35 U.S.C. 154(b) by 437 days.

This patent is subject to a terminal disclaimer.

(21) Appl. No.: 14/168,499

(22) Filed: Jan. 30, 2014

(65) Prior Publication Data

US 2015/0170771 A1 Jun. 18, 2015

Related U.S. Application Data

(63) Continuation-in-part of application No. 14/109,072, filed on Dec. 17, 2013.

(51) Int. Cl.
*G21C 15/18* (2006.01)
*G21C 9/004* (2006.01)
*G21C 11/04* (2006.01)
*G21C 13/024* (2006.01)
*G21C 13/093* (2006.01)
*G21C 17/112* (2006.01)
*G21D 5/02* (2006.01)

(52) U.S. Cl.
CPC ............... *G21C 15/18* (2013.01); *G21C 9/004* (2013.01); *G21C 11/04* (2013.01); *G21C 13/024* (2013.01); *G21C 13/093* (2013.01); *G21C 17/112* (2013.01); *G21D 5/02* (2013.01); *Y02E 30/40* (2013.01)

(58) Field of Classification Search
CPC .......... G21C 15/18; G21C 9/004; G21C 11/04
USPC .......... 376/247, 273, 282, 283, 293, 317, 909, 376/912
See application file for complete search history.

(56) References Cited

U.S. PATENT DOCUMENTS

| 3,047,485 | A | * | 7/1962 | Ellis | G21C 15/18 376/282 |
|---|---|---|---|---|---|
| 4,135,468 | A | * | 1/1979 | Kirby | B63B 25/006 114/260 |
| 2014/0328445 | A1 | * | 11/2014 | Haratyk | G21C 15/18 376/282 |
| 2015/0131769 | A1 | * | 5/2015 | Larrion | G21C 15/18 376/282 |

* cited by examiner

Primary Examiner — Jack W Keith
Assistant Examiner — Daniel Wasil
(74) Attorney, Agent, or Firm — Dennis L. Thomte; Thomte Patent Law Office LLC

(57) ABSTRACT

A floating nuclear power reactor includes a self-cooling containment structure and an emergency heat exchange system. The containment structure of the reactor may be flooded upon the temperature or pressure in the containment structure reaching a certain level. The reactor vessel may also be flooded upon the temperature or pressure in the reactor vessel reaching a predetermined level. The reactor includes a heat exchange system and a filtered containment venting system. The reactor also includes a multi-compartment containment structure. Multiple steam by-pass pipes extend to the filtered containment vent chamber.

10 Claims, 3 Drawing Sheets

FLOATING NUCLEAR POWER REACTOR WITH A SELF-COOLING MULTIPLE COMPONENT CONTAINMENT STRUCTURE AND AN AUTOMATIC RADIATION SCRUBBING CONTAINMENT STRUCTURE

CROSS REFERENCE TO RELATED APPLICATION

This is a Continuation-In-Part application of application Ser. No. 14/109,072, filed Dec. 17, 2013, entitled FLOATING NUCLEAR POWER REACTOR WITH A SELF-COOLING CONTAINMENT STRUCTURE.

BACKGROUND OF THE INVENTION

1. Field of the Invention

This invention relates to a floating nuclear power reactor and more particularly to a floating nuclear power reactor wherein the containment structure of the reactor is self-cooling. More particularly, this invention relates to a floating nuclear power reactor wherein the containment structure is comprised of multiple components. Even more particularly, the reactor includes an automatic radiation scrubbing system.

2. Description of the Related Art

In most nuclear power reactors, a primary electrically operated water pump supplies cooling water to the reactor. In many cases, a secondary or back-up water pump is provided in case the primary water pump becomes inoperative. However, should the electrical power source for the water pump or water pumps be disrupted such as in a tsunami, a typhoon or an earthquake, the water pumps are not able to pump cooling water to the reactor which may result in a dangerous meltdown. Further, in some situations, the pipes supplying cooling water to the reactor may fail due to natural causes or a terrorist attack.

Currently, there are land based reactor cooling systems available which store water in a tank above the level of the reactor which will passively feed the reactor in case of pump or electricity failure. These tanks are designed to have enough water to cool the system for three days until help can arrive and more water can be pumped in from outside. The problem is that water stored in these tanks is of finite quantity. The tanks will work in case of an emergency shut down like in Fukushima, Japan, but will not work in the case of a pipe breakdown leaking a huge amount of water to the exterior. The reactor core will heat the water supplied from the tank and steam will escape via the pipe breakdown and the water will run out. Once the water runs out, the reactor core will melt due to overheating and explode. It is therefore necessary to be able to supply an infinite amount of water to compensate for lost water via a leaking pipe.

Further, current day reactors are protected by huge containment structures but this is not the answer to pipe breakdown outside or inside the containment chambers. A terrorist attack on the turbine room outside the containment structure is probably more dangerous than an attack on the containment structure since such an attack would result in multiple pipes breaking down, thereby breaking the water circuit between the reactor, turbine and condenser. Such an attack could also result in a breakdown of electrical control systems. This would result in the loss of circulating water to the reactor with the emergency stored water being unable to compensate for all the leaking pipes. In such a situation, the reactor will overheat without heat removal and explode.

The containment structures of the prior art nuclear power reactors normally include a thick outer containment structure which is comprised of concrete. The thick outer concrete containment structure is somewhat difficult to construct and even more difficult to demolish when the reactor is being replaced. Additionally, the prior art does not provide an efficient automatic radiation scrubbing system.

The invention of the co-pending parent application represents a major improvement in the art. The instant invention represents a further improvement in the art.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A floating nuclear power reactor is disclosed. A nuclear power reactor is mounted or positioned on a floating barge-like vessel with the barge-like vessel having an upper end positioned above the water level of a body of water and a lower end positioned beneath the water level of the body of water. Side walls extend between the lower and upper ends of the floating vessel. The nuclear power reactor is positioned on the bottom of the barge-like vessel. The nuclear power reactor includes a first concrete containment member having a lower end, an upstanding sidewall, and an upper end. A cover closes the upper end of the first containment member. A second concrete containment member is positioned in the interior of the first containment member in a spaced-apart relationship so that the inner side of the first containment member is spaced from the outer side of the second containment member to define a first space between the walls thereof. The first space is filled with sand to define a third containment member.

The relationship of the first containment member, the second containment member, and the cover define a vent chamber. The vent chamber is filled with a filter material such as stones or rocks, chemicals and water. One or more steam exhaust pipes extend outwardly from the upper end of the vent chamber through the cover to the atmosphere. A reactor vessel, having upper and lower ends, is positioned in the interior compartment of the second containment member with the reactor vessel being positioned below the water level of the body of water. The reactor vessel includes an interior compartment having upper and lower ends.

One or more steam exhaust pipes extend through the second containment member so that one end thereof is in communication with the upper end of the interior compartment thereof and so that the other end thereof is in communication with the vent chamber. One or more steam return pipes are associated with the reactor vessel so that one end thereof is in communication with the upper end of the interior compartment of the reactor vessel and so that the other end is in communication with the lower end of the interior compartment of the reactor vessel. In the preferred embodiment, one of the return pipes is of the closed loop type. In the closed loop return pipe structure, the return pipe is filled with a coolant. A portion of the closed loop return pipe is positioned in the interior compartment of the second containment member. The return pipes form a heat exchanger system. A steam exhaust pipe extends from the upper end of the interior compartment of the reactor vessel outwardly through the second and first containment members to a turbine.

At least one first water passageway, having inner and outer ends, extends through the bottom of the vessel and the bottom of the second containment member with the outer end of the first water passageway being in fluid communication with the body of water. The inner end of the first water passageway is in fluid communication with the interior compartment of the second containment member. A spring-loaded first hatch is movably mounted in the first water passageway. The first hatch is movable between a closed position and an open position. The first hatch, when in its closed position, closes the outer end of the first water passageway. The first hatch, when in its open position, permits water from the body of water to flow inwardly through the first water passageway into the interior compartment of the second containment member to cool the reactor vessel.

A first latching means is associated with the first hatch with the first latching means being movable between a latched position and an unlatched position. The first latching means, when in its latched position, maintains the first hatch in its closed position. The first latching means, when in its unlatched position, permits the first hatch to move from its closed position to its open position. A first condition responsive actuator is associated with the first latching means and the interior compartment of the second containment member to move the first latching means from its latched position to its unlatched position upon the condition, either temperature or pressure, in the interior compartment of the second containment member reaching a predetermined level.

At least one second water passageway, having inner and outer ends, extends through the bottom of the vessel into the interior of the reactor vessel. A second hatch is movably mounted in the second water passageway. The second hatch is movable between a closed position and an open position. The second hatch closes the outer end of said second passageway when in its closed position. The second hatch, when in its open position, permits water from the body of water to flow inwardly into the interior of the reactor vessel to cool the reactor vessel. A second latching means is associated with the second hatch which is movable from a latched position to an unlatched position. The second latching means, when in its latched position, maintains the second hatch in its closed position. The second latching means, when in its unlatched position, permits the second hatch to move from its closed position to its open position. A condition, either temperature or pressure, responsive actuator is associated with the second latching means and the interior compartment of the reactor vessel to move the second latching means from its latched position to its unlatched position upon the condition within the interior compartment of the reactor vessel reaching a predetermined level.

One or more steam exhaust pipes are also provided which extend from the upper end of the interior compartment of the second containment member to the lower end of the vent chamber. One or more steam exhaust pipes extend outwardly from the upper end of the vent chamber through the cover to the atmosphere.

A steam exhaust pipe extends from the upper end of the interior compartment of the reactor vessel, outwardly through the interior compartment of the second containment member, thence through the space between the second and first containment members, thence through the first containment member to a turbine. A normally open valve is positioned in the steam exhaust pipe, which extends to the turbine. One or more steam by-pass pipes extend from the steam exhaust pipe which extends to the turbine. The steam by-pass pipe communicates with the lower interior of the vent chamber. A normally closed valve is imposed in each of the steam by-pass pipes.

Although the hatch latching means and condition responsive actuators are described in detail, the hatches could be opened by other means such as mechanical or electrical devices.

It is therefore a principal object of the invention to provide an improved floating nuclear power reactor.

A further object of the invention is to provide a floating nuclear power reactor which is self-cooling upon the temperature or pressure reaching a predetermined level in the inner containment member or reactor vessel of the nuclear power reactor.

A further object of the invention is to provide a self-cooling nuclear power reactor.

A further object of the invention is to provide a self-cooling nuclear power reactor including an automatic radiation scrubbing containment structure.

A further object of the invention is to provide a self-cooling nuclear power reactor which has an unlimited or infinite supply of cooling water, even in the event of a break in the steam line which extends to the turbine.

A further object of the invention is to provide an invention of the type described including at least one and preferably multiple, return lines associated with the reactor vessel and the interior compartment of the second containment member.

A further object of the invention is to provide a cooling mechanism for a floating nuclear power reactor which does not require electrical power to operate.

A further object of the invention is to provide an invention of the type described wherein the outer confinement structure is comprised of multiple components.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
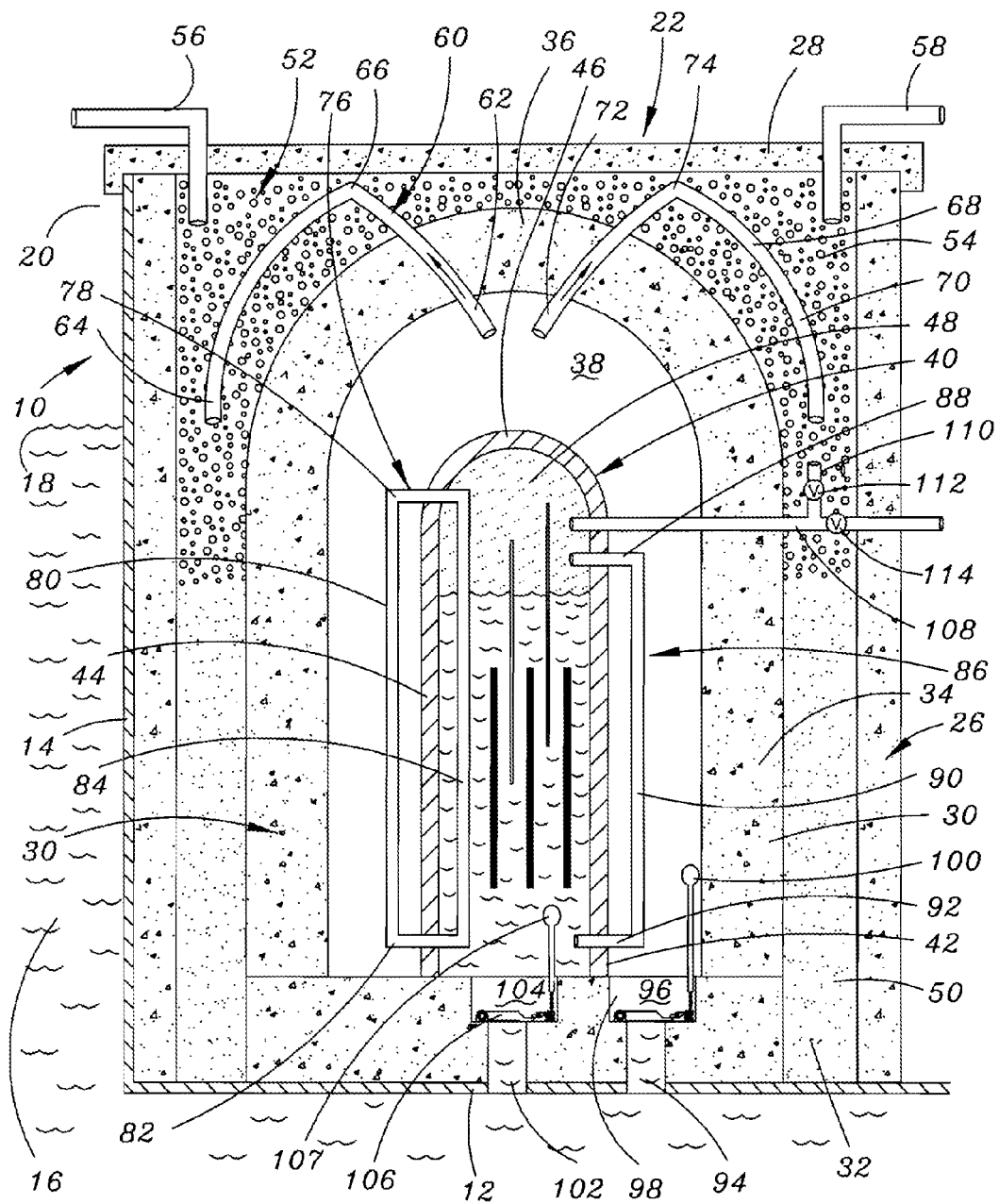
FIG. 1 is a sectional view of the nuclear power reactor of this invention in its normal operating condition.
Figure 2:
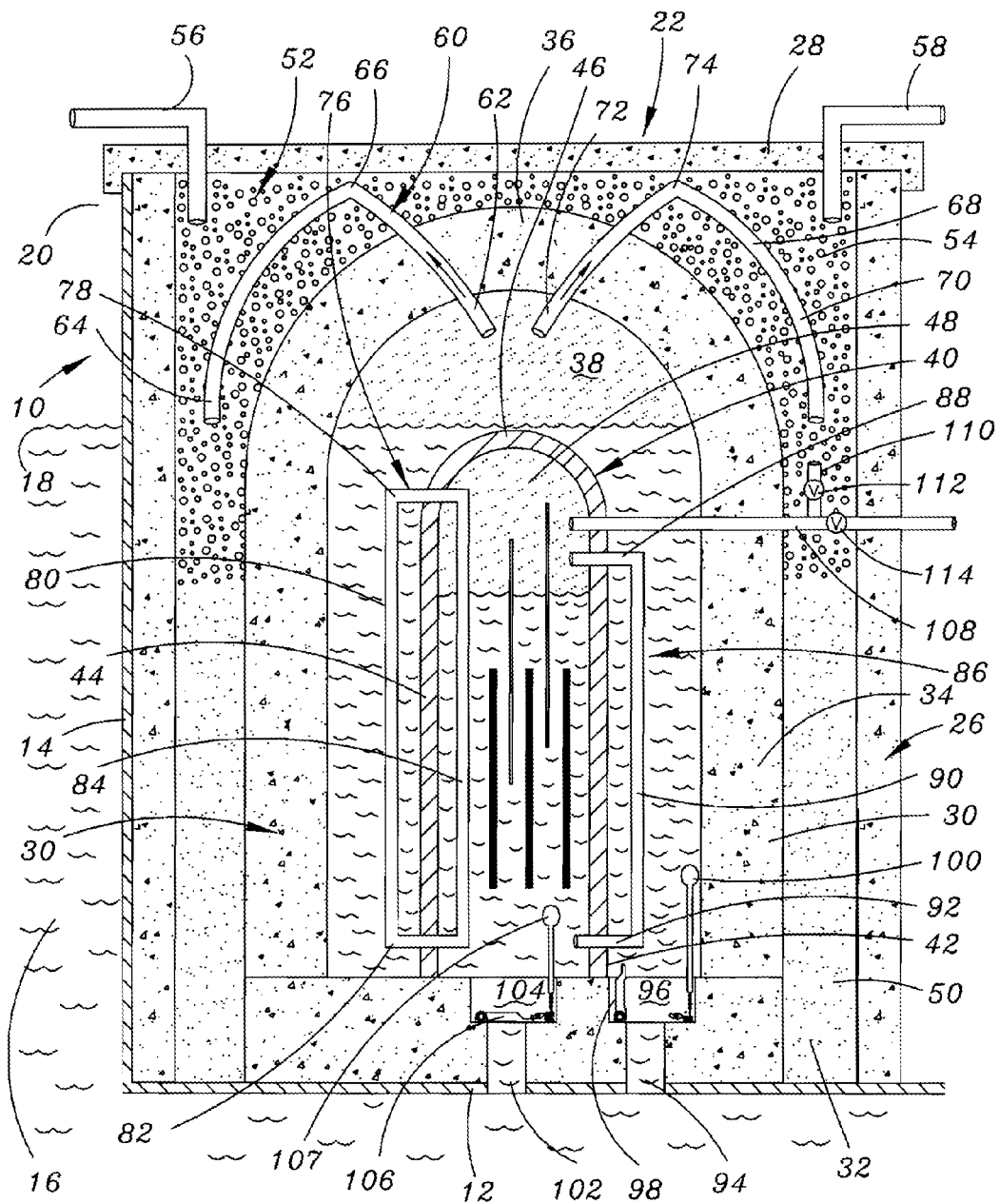
FIG. 2 is a view similar to FIG. 1 except that the first water passageway has been opened to flood the interior of the inner compartment member.
Figure 3:
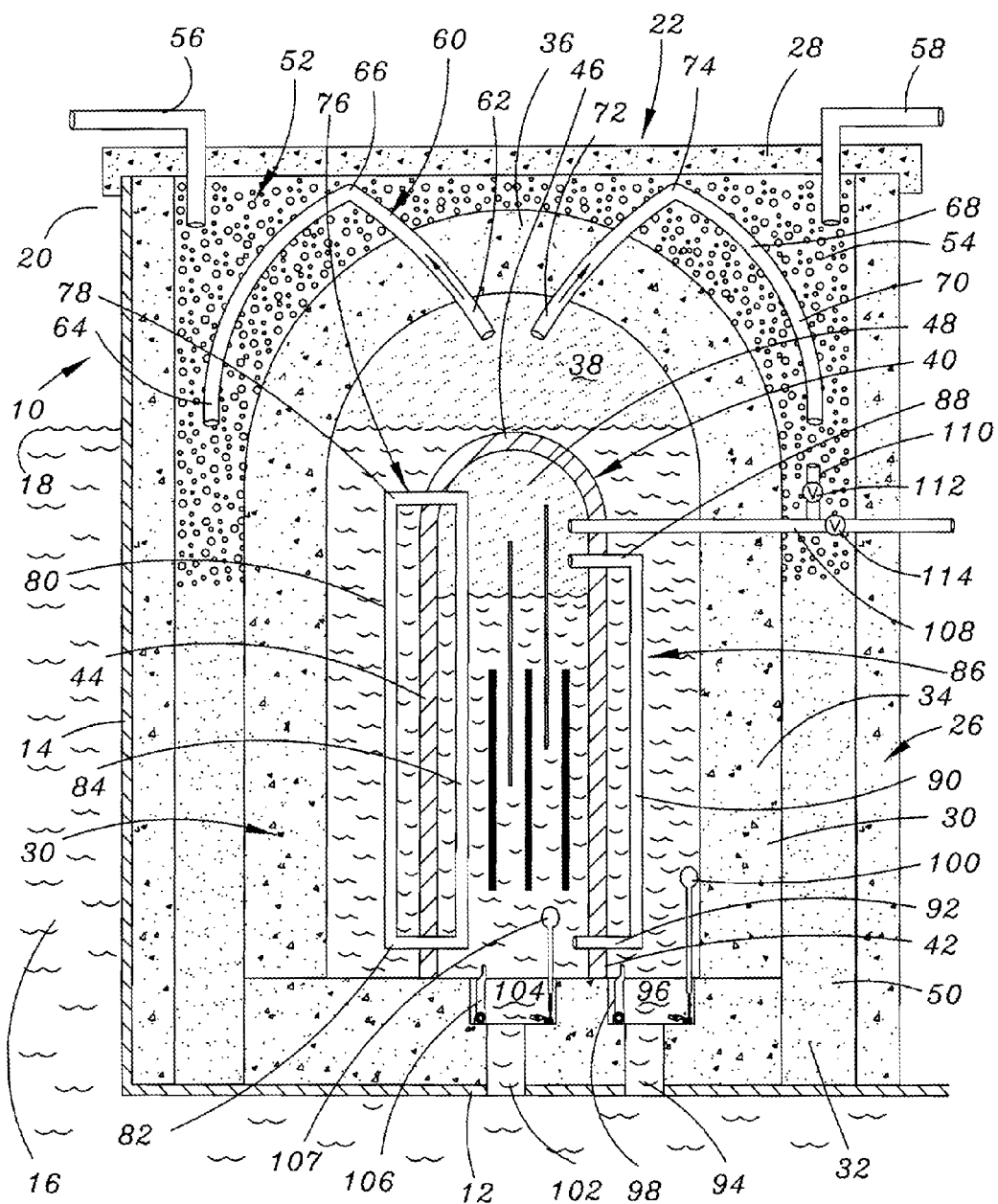
FIG. 3 is a view similar to FIG. 2 except that the second water passageway has been opened to flood the interior compartment of the reactor vessel.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a floating vessel such as a barge as shown in the co-pending application Ser. No. 14/109,072, filed Dec. 17, 2013, entitled FLOATING NUCLEAR POWER REACTOR WITH A SELF-COOLING CONTAINMENT STRUCTURE. Barge 10 could be a ship hull or other floating structure. The detail of the barge 10 will not be disclosed other than to say that the barge 10 includes a bottom 12, upstanding ends, and upstanding sides. One of the sides 14 of the barge is shown in the drawings. Barge 10 may be constructed of any suitable material such as steel, concrete, etc.

Barge 10 is shown as floating in a body of water 16 such as a lake, ocean, sea, etc. For reference purposes, the body of water 16 will be described as having a water level 18. As seen, the upper end 20 of barge 10 is positioned above the water level 18 with a majority of the barge 10 being submerged in the body of water 16.

A nuclear power reactor 22 is positioned on the barge 10 as shown in the drawings. Normally, a second nuclear power reactor would also be positioned on the barge 10 such as shown in the co-pending application. Further, there could be several nuclear power reactors positioned on the barge.

Reactor 22 includes a containment member 26 which is cylindrical in shape and which is preferably constructed of concrete. Containment member 26 could be constructed of other materials such as metal, etc. A cover or lid 28 closes the upper end of containment member 26.

Reactor 22 includes an upstanding containment member 30 constructed of concrete and which includes a bottom 32, an upstanding side wall 34 and an upper end 36 which defines a sealed interior compartment 38. Usually, containment member 30 will have a greater thickness than containment member 26. A reactor vessel 40 is positioned in compartment 38 and includes an open bottom 42, side wall 44, and upper end 46 which define a sealed interior compartment 48. As seen, the bottom 42 of reactor vessel 40 is positioned on the upper end of bottom 32 of containment structure 30. The reactor vessel 40 also functions as a containment member for the core of the reactor.

Containment member 30 is spaced inwardly of containment member 26 as seen in FIG. 1. The lower portion of the space between containment member 26 and the side wall 34 of containment member 26 is filled with sand 50. The space above the upper end of sand 50 is designated by the reference numeral 52 and defines a vent chamber 54. Vent chamber 54 is filled with a combination of rocks, or stones, chemicals and water to create a radiation scrubbing containment structure. The containment members 26, 30 and the space therebetween which is filled with sand 50 combine to create a very strong outer containment structure with the reactor vessel 40 forming an inner containment structure.

The numeral 60 refers to a steam exhaust pipe comprised of pipe sections 62 and 64. As seen, pipe portion 62 has its inner end in communication with the upper portion of compartment 38. Pipe portion 64 extends downwardly from pipe portion 62 at 66. The lower end of pipe portion 62 is in communication with the lower end of vent chamber 54. The shape of the pipe 60 permits the pipe 60 to function as an anti-siphon exhaust pipe.

A second steam exhaust pipe 68 comprised of pipe sections 70 and 72 will now be described. As seen, pipe section 70 extends upwardly and outwardly from the upper end of compartment 38 to 74 where pipe portion 72 extends downwardly and outwardly therefrom. The lower end of pipe portion 74 is in communication with the lower end of chamber 54. The inner end of pipe portion 70 is in communication with the upper end of compartment 38 as seen in the drawings. The shape of the pipe 70 permits the pipe 70 to function as an anti-siphon exhaust pipe.

The numeral 76 refers to a return pipe or line having pipe portions 78, 80, 82 and 84. Pipe portion 78 extends outwardly from compartment 48 adjacent the upper end of wall 44. Pipe portion 80 extends downwardly from the outer end of pipe portion 78, as seen in the drawings. Pipe portion 82 extends inwardly from the lower end of pipe portion 80, through side wall 44, into compartment 48 at the lower end thereof. Pipe portion 84 extends between the inner ends of pipe portions 78 and 82 to provide a closed loop return pipe. The return pipe 76 is filled with a liquid coolant such as sodium, water, etc. As seen, pipe portion 80 and a portion of pipe portions 78 and 82 are in interior compartment 38. Although a single return pipe 76 is shown, additional return pipes could be utilized. The return pipe 76 functions as a heat exchange structure.

The numeral 86 refers to a steam return pipe having pipe portions 88, 90 and 92. Pipe portion 88 extends outwardly from compartment 48 adjacent the upper end of side wall 44. Pipe portion 90 extends downwardly from the outer end of pipe portion 88. Pipe portion 92 extends inwardly from the lower end of pipe portion 90 through side wall 44 into compartment 48 at the lower thereof. Although one steam return pipe 86 is shown and described, any number of the steam return pipes 86 could be utilized. The return pipe 86 functions as a heat exchange structure.

A water passageway 94 extends upwardly through bottom 12 of barge 10 and through bottom 32 of containment member 30. The inner end of passageway 94 communicates with a larger water passageway 96, which communicates with the interior compartment 38 of containment member 30. A spring-loaded latch 98, which is identical to that shown and described in the co-pending application, is positioned in water passageway 96 to close water passageway 94. Hatch 98 includes a spring (not shown) which urges hatch 98 to its open position. A latching means (not shown), which is identical to that shown in the co-pending application, is associated with the hatch 98 with the latching means being movable between a latched position and an unlatched position as described in the co-pending application. The latching means, when in its latched position, maintains the hatch 98 in its closed position. The latching means, when in its unlatched position, permits the hatch 98 to move from its closed position to its open position. A condition responsive actuator 100, identical to that shown and described in the co-pending application, is associated with the latching means to move the latching means from its latched position to its unlatched position upon the condition, either pressure or temperature, in the interior compartment 38 of containment member 30 reaching a predetermined level. Any number of the water passageways 94 and 96 and the associated structure could be utilized.

A water passageway 102 extends upwardly through bottom 12 of barge 10 and through bottom 32 of containment member 30. The inner end of passageway 102 communicates with a larger passageway 104, which communicates with the interior compartment 48 of reactor vessel 40. A spring loaded hatch 106, which is identical to that shown in the co-pending application, is positioned in the water passageway 104 to close water passageway 102. Hatch 106 includes a spring (not shown), which urges hatch 106 to its open position. A latching means, identical to that shown in the co-pending application, is associated with the hatch 106 with the latching means being movable between a latched position and an unlatched position. The latching means, when in its latched position, maintains the hatch 106 in its closed position. The latching means, when in its unlatched position, permits the hatch 106 to move from its closed position to its open position. A condition responsive actuator 107, which is identical to that shown and described in the co-pending application, is associated with the latching means to move the latching means from its latched position to its unlatched position, upon the condition, either temperature or pressure, in the interior compartment 48 of reactor vessel 40 reaching a predetermined level.

The numeral 108 refers to a steam exhaust pipe which extends from the upper end of interior compartment 48 of reactor vessel 40 to a conventional turbine. As seen, steam pipe 108 extends outwardly through side wall 44 of reactor vessel 40, through interior compartment 38, through containment member 30, and through containment member 26. One or more steam by-pass pipes 110 extend upwardly from steam exhaust pipe 108 and pass into vent chamber 54 as seen in the drawings. A normally closed valve 112 is imposed in by-pass pipe 110. A normally open valve 114 is imposed in steam exhaust pipe 108 as seen in the drawings. The valves 112 and 114 will be of the remote control electrically operated type. Thus, if pipe 108 should be broken outwardly of containment member 26, valve 114 will be closed to prevent steam from leaking from pipe 108. In that case, the valve 112 will be opened so that steam from pipe 108 will pass upwardly through pipe 110 into the vent chamber 54 wherein radiation in the steam will be scrubbed therefrom before exiting to the atmosphere by way of the pipes 56 and 58.

The instant invention functions as will be described. FIG. 1 illustrates the instant nuclear power reactor in its normal operating mode. In that mode: (1) hatches 98 and 106 are closed; (2) the return pipes 76 and 86 will not be functioning since pipe portions 80 and 90 are not being cooled by any surrounding coolant (water) and will stay at the same temperature as the reactor coolant; (3) valve 114 will be open and valve 112 will be closed; (4) steam exhaust pipes 56 and 58 will be inactive; (5) and the core of the reactor vessel will heat the water in the interior compartment thereof so that steam is created and passed to the turbine through steam exhaust pipe 108.

The condition responsive actuator 100, upon sensing a predetermined level of pressure or temperature in interior compartment 38, will unlatch the latching means associated with hatch 98, to open hatch 98 thereby creating a temporary pool of water in interior compartment 38 of containment member 30. The temporary pool of water in interior compartment 38 surrounds reactor vessel 40 to cool reactor vessel 40. Reactor vessel 40 is further cooled by the return pipe 76. As the coolant material in pipe portion 84 is heated by the core of the reactor vessel 40, the coolant material will rise in pipe portion 84 and will pass outwardly through pipe portion 78 and thence downwardly through pipe portion 80. The coolant material in pipe portion 80, as it moves downwardly in pipe portion 80, will be cooled since pipe portion 80 is surrounded by the flood water in interior compartment 38. The cooled coolant material will then pass from the lower end of pipe 80 into the interior compartment 48 of reactor vessel 40 by way of pipe portion 82. The cooled material in pipe portion 84 cools the core of the reactor vessel. As the material in pipe portion 84 is heated, the material will rise upwardly through pipe portion 84 and thence again move outwardly through pipe portion 78. The heating and cooling of the material in return pipe 76 causes a continual flow of the coolant material through the heat exchanger system created by return pipe 76. The return pipe 86 functions similarly to return pipe 76 except that return pipe 86 is an open return system rather than a closed loop system as is pipe 76. Steam from interior compartment 48 exits outwardly therefrom by way of pipe portion 88. The steam then passes downwardly through pipe portion 90 which is cooled by the flood water in interior compartment 38. As the steam moves downwardly in pipe portion 72, it is cooled and turns to liquid, with the cooled liquid being returned to the interior compartment 48 of reactor vessel 40 to cool the reactor vessel. The water in interior compartment 38 gets hot in this process and evaporates or turns into steam. This heated water has not been in contact with radioactive material. However, to be safe, the steam in interior compartment 38 is vented into vent chamber 54 and is filtered and scrubbed by the filter material in vent chamber 54 and is passed to the atmosphere by way of the steam exhaust pipes 56 and 58. This process is continued until the temperature in the reactor vessel 40 comes down.

The trigger point set to open hatch 98 will be much lower than the trigger point set to open the hatch 106. In this way, there is no sea water entry into the reactor vessel. In the very unlikely scenario that the above described process is unable to cool the core of the reactor vessel 40, and the temperature in the reactor vessel rises, the trigger point to open the hatch 106 would become operational (at the upper safety margins). When water enters reactor vessel 40, it will evaporate and steam goes into steam exhaust pipe 108 and to the turbine. By opening valve 112, steam passes into the vent chamber 54 where it is filtered and then vented to the atmosphere by way of steam exhaust pipes 56 and 58. The filter material in vent chamber 54 and the venting of the steam therefrom functions as a filtered containment venting system.

In the event that there is a pipe breakage or leakage in pipe 108 downstream of the reactor, valve 114 may be closed and valve 112, in each of the steam by-pass pipes 110, opened so that the steam from the upper end of interior compartment 114 will be vented through pipes 110 and passed through the filter material in vent chamber 54 and thence to the atmosphere by way of steam exhaust pipes 56 and 58.

Although the foregoing description explains the hatches and the actuation of those hatches in detail, it should be noted that the hatches could be opened by means other than that shown. For example, the hatches could be operated by electrical means or by other mechanical means.

Further, the barge could be submerged so that the bottom thereof rests on the floor of the body of water. In that case, the hatches would be formed in the side of the barge as disclosed in the co-pending application.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:
1. A floating nuclear power reactor, comprising:
   a floating vessel having a bottom positioned beneath the water level of a body of water, sides extending upwardly from said bottom, and an upper end which is positioned above the water level of the body of water;
   a cylindrical first containment member;
   said first containment member having a lower end, an open upper end, and a cylindrical side wall with inner and outer sides;
   said lower end of said first containment member being positioned on said bottom of said floating vessel;
   a cover closing said open upper end of said first containment member;
   a cylindrical second containment member positioned within said first containment member;

said second containment member including a bottom, an upstanding side wall with inner and outer sides, and a domed upper end;

said second containment member having an interior compartment with upper and lower ends;

said bottom of said second containment member being positioned on said bottom of said floating vessel;

said outer side of said side wall of said second containment member being spaced inwardly of said inner side of said side wall of said first containment member to define a first space therebetween;

said first space being filled with sand;

said domed upper end of said second containment member, and said inner side of said first containment member forming a vent chamber above the upper end of the sand in said first space;

said vent chamber being filled with a filter material;

at least a first steam exhaust pipe extending from said vent chamber to the atmosphere;

at least a second steam exhaust pipe extending upwardly and outwardly from said upper end of said interior compartment of said second containment member into said vent chamber, thence downwardly in said vent chamber;

an upstanding reactor vessel, having upper and lower ends, positioned in said interior compartment of said second containment member;

said lower end of said reactor vessel being positioned on said bottom of said second containment member;

said reactor vessel having an interior compartment with upper and lower ends;

a third steam exhaust pipe extending from said upper end of said interior compartment of said reactor vessel outwardly through said second and first containment members to a turbine;

one or more by-pass steam exhaust pipes positioned in said first space extending from said third steam exhaust pipe to said vent chamber;

a normally closed first valve in each of said by-pass steam exhaust pipes;

a normally open second valve in each of said third steam exhaust pipe in said first space;

at least one first return pipe extending outwardly from said upper end of said interior compartment of said reactor vessel into said interior compartment of said second containment member, thence downwardly, and thence inwardly into said interior compartment of said reactor vessel at said lower end thereof and thence upwardly to create a closed loop heat exchange structure;

a first water passageway, having inner and outer ends, extending through said bottom of said second containment member;

said outer end of said first water passageway being in fluid communication with the body of water;

said inner end of said first water passageway being, in fluid communication with said interior compartment of said second containment member;

a first hatch associated with said first water passageway;

said first hatch being movable between a closed position and an open position;

said first hatch, when in said closed position, closing said first water passageway;

said first hatch, when in said open position, permitting water from the body of water to flow inwardly through said first water passageway into said interior compartment of said second containment member;

a second water passageway, having inner and outer ends, extending through said bottom of said second containment member;

said outer end of said second water passageway being in fluid communication with the body of water;

said inner end of said second water passageway being in fluid communication with said interior compartment of said reactor vessel;

a second hatch movably associated with said second water passageway;

said second hatch being movable between a closed position and an open position;

said second hatch, when in said closed position, closing said second water passageway;

said second hatch, when in said open position, permitting water from the body of water to flow inwardly through said second water passageway into said interior compartment of said reactor vessel;

said first hatch being movable from its said closed position to its said open position when a condition within said interior compartment of said second containment member reaches a predetermined level thereby permitting water from the body of water to flow into said interior compartment of said second containment member; and said second hatch being movable from its said closed position to its said open position when a condition within said interior compartment of said reactor vessel reaches a predetermined level thereby permitting water from the body of water to flow into said interior compartment of said reactor vessel.

2. The floating nuclear power reactor of claim 1 wherein the predetermined condition level within said interior compartment of said second containment member is lower than the predetermined condition level within said interior compartment of said reactor vessel whereby said first hatch will move from its said closed position to its said open position prior to said second hatch moving from its said closed position to its said open position so that said interior compartment of said second containment member will be flooded prior to said interior compartment of said reactor vessel being flooded.

3. The floating nuclear power reactor of claim 1 wherein a plurality of first steam exhaust pipes extend from said vent chamber to the atmosphere.

4. The floating nuclear power reactor of claim 1 wherein a plurality of second steam exhaust pipes extend from said upper end of said interior compartment of said second containment member into said vent chamber.

5. The floating nuclear power reactor of claim 1 wherein said filter material is comprised of rocks, chemicals and water.

6. The floating nuclear power reactor of claim 1 wherein a plurality of first return steam pipes extend outwardly from said upper end of said interior compartment of said reactor vessel, thence downwardly, and thence inwardly into said interior compartment of said reactor vessel at said lower end thereof and thence upwardly to form a closed loop heat exchanger structure.

7. The floating nuclear power reactor of claim 1 wherein said second steam exhaust pipe has a generally inverted V-shape.

8. The floating nuclear power reactor of claim 4 wherein each of said second steam exhaust pipes have a generally inverted V-shape.

9. A floating nuclear power reactor, comprising:
a floating vessel having a bottom positioned beneath the water level of a body of water, sides extending upwardly from said bottom, and an upper end which is positioned above the water level of the body of water;
a cylindrical first containment member;
said first containment member having a lower end, an open upper end, and a cylindrical side wall with inner and outer sides;
said lower end of said first containment member being positioned on said bottom of said floating vessel;
a cover closing said open upper end of said first containment member;
a cylindrical second containment member positioned within said first containment member;
said second containment member including a bottom, an upstanding side wall with inner and outer sides, and a domed upper end;
said second containment member having an interior compartment with upper and lower ends;
said bottom of said second containment member being positioned on said bottom of said floating vessel;
said outer side of said side wall of said second containment member being spaced inwardly of said inner side of said side wall of said first containment member to define a first space therebetween;
said first space being filled with sand;
said domed upper end of said second containment member, and said inner side of said first containment member forming a vent chamber above the upper end of the sand in said first space;
said vent chamber being filled with a filter material;
at least one first steam exhaust pipe extending from said vent chamber to the atmosphere;
at least one second steam exhaust pipe extending upwardly and outwardly from said upper end of said interior compartment of said second containment member into said vent chamber, thence downwardly in said vent chamber;
an upstanding reactor vessel, having upper and lower ends, positioned in said interior compartment of said second containment member;
said lower end of said reactor vessel being positioned on said bottom of said second containment member;
said reactor vessel having an interior compartment with upper and lower ends;
a third steam exhaust pipe extending from said upper end of said interior compartment of said reactor vessel outwardly through said second and first containment members to a turbine;
one or more by-pass steam exhaust pipes positioned in said first space extending from said third steam exhaust pipe to said vent chamber;
a normally closed first valve in each of said by-pass steam exhaust pipes;
a normally open second valve in said third steam exhaust pipe in said first space;
at least one first return pipe extending outwardly from said upper end of said interior compartment of said reactor vessel into said interior compartment of said second containment member, thence downwardly, and thence inwardly into said interior compartment of said reactor vessel at said lower end thereof and thence upwardly to create a closed loop heat exchange structure;
said at least one first return pipe being filled with a liquid coolant material;
a first water passageway, having inner and outer ends, extending through said bottom of said second containment member;
said outer end of said first water passageway being in fluid communication with the body of water;
said inner end of said first water passageway being, in fluid communication with said interior compartment of said second containment member;
a normally closed first hatch associated with said first water passageway;
said first hatch being movable between a closed position and an open position;
said first hatch, when in said closed position, closing said first water passageway;
said first hatch, when in said open position, permitting water from the body of water to flow inwardly through said first water passageway into said interior compartment of said second containment member;
a second water passageway, having inner and outer ends, extending through said bottom of said second containment member;
said outer end of said second water passageway being in fluid communication with the body of water;
said inner end of said second water passageway being in fluid communication with said interior compartment of said reactor vessel;
a second hatch movably associated with said second water passageway;
said second hatch being movable between a closed position and an open position;
said second hatch, when in said closed position, closing said second water passageway;
said second hatch, when in said open position, permitting water from the body of water to flow inwardly through said second water passageway into said interior compartment of said reactor vessel;
said first hatch being movable from its said closed position to its said open position when a condition within said interior compartment of said second containment member reaches a predetermined level thereby permitting water from the body of water to flow into said interior compartment of said second containment member; and
said second hatch being movable from its said closed position to its said open position when a condition within said interior compartment of said reactor vessel reaches a predetermined level thereby permitting water from the body of water to flow into said interior compartment of said reactor vessel.

10. A floating nuclear power reactor, comprising:
a floating vessel having a bottom positioned beneath the water level of a body of water, sides extending upwardly from said bottom, and an upper end which is positioned above the water level of the body of water;
a cylindrical first containment member;
said first containment member having a lower end, an open upper end, and a cylindrical side wall with inner and outer sides;
said lower end of said first containment member being positioned on said bottom of said floating vessel;
a cover closing said open upper end of said first containment member;
a cylindrical second containment member positioned within said first containment member;
said second containment member including a bottom, an upstanding side wall with inner and outer sides, and a domed upper end;
said second containment member having an interior compartment with upper and lower ends;
said bottom of said second containment member being positioned on said bottom of said floating vessel;

said outer side of said side wall of said second containment member being spaced inwardly of said inner side of said side wall of said first containment member to define a first space therebetween;

said first space being filled with a particulate material;

an upstanding reactor vessel, having upper and lower ends, positioned in said interior compartment of said second containment member;

said lower end of said reactor vessel being positioned on said bottom of said second containment member;

said reactor vessel having an interior compartment with upper and lower ends;

a steam exhaust pipe extending from said upper end of said interior compartment of said reactor vessel outwardly through said second and first containment members to a turbine;

a first water passageway, having inner and outer ends, extending through said floating vessel into said interior compartment of said second containment member;

said outer end of said first water passageway being in fluid communication with the body of water;

said inner end of said first water passageway being, in fluid communication with said interior compartment of said second containment member;

a first hatch associated with said first water passageway;

said first hatch being movable between a closed position and an open position;

said first hatch, when in said closed position, closing said first water passageway;

said first hatch, when in said open position, permitting water from the body of water to flow inwardly through said first water passageway into said interior compartment of said second containment member;

said first hatch being movable from its said closed position to its said open position upon the temperature or pressure in said interior compartment of said second containment member reaching a predetermined level;

a second water passageway, having inner and outer ends, extending through said floating vessel into said interior compartment of said reactor vessel;

said outer end of said second water passageway being in fluid communication with the body of water;

a second hatch movably associated with said second water passageway;

said second hatch being movable between a closed position and an open position;

said second hatch, when in said closed position, closing said second water passageway;

said second hatch, when in said open position, permitting water from the body of water to flow inwardly through said second water passageway into said interior compartment of said reactor vessel;

said second hatch being movable from its said closed position to its said open position upon the temperature or pressure in said interior compartment of said reactor vessel reaching a predetermined level.

* * * * *